May 8, 1951  E. S. CHAPMAN  2,552,405
ELECTRIC STORAGE BATTERY
Filed Dec. 11, 1945
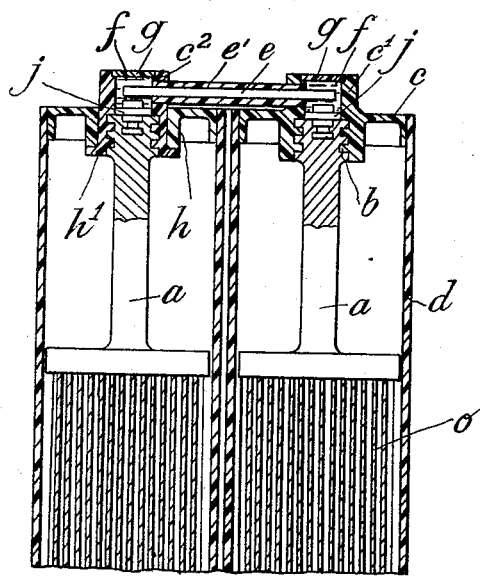
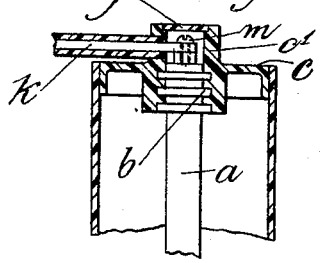
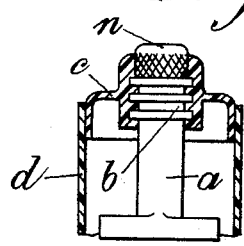
INVENTOR
EDWARD SPENCE CHAPMAN Patented May 8, 1951

2,552,405

UNITED STATES PATENT OFFICE 2,552,405

ELECTRIC STORAGE BATTERY

Edward Spence Chapman, Dagenham Dock, England, assignor to The Electric Storage Battery Co., a corporation of New Jersey Application December 11, 1945, Serial No. 634,218
In Great Britain October 18, 1944

Section 1, Public Law 690, August 8, 1946
Patent expires October 18, 1964

2 Claims. (Cl. 136—168)

This invention relates to electric storage batteries and in particular to batteries of light weight for use in aircraft or other situations where it is essential to save both weight and space.

Such batteries usually have cases of molded material, through the lid or cover of which the upper ends of the lead plate-supporting pillars are extended to carry the inter-cell connecting members also formed of lead and these pillars have been united to lead bushes in the molded covers and to the connectors by burning.

Proposals have now been made to use a thermoplastic resin such as polystyrene resin in place of the heavier section molding compositions hitherto employed for the lid and case, but the use of heat to unite the pillars to the connectors and the bushes in the cell lids destroys such resinous thermoplastic composition lids, and consequently, the acid tight joints. The object of this invention is to provide an improved method of supporting the pillars in the containers and of uniting them to the inter-cell or take-off connections.

According to this invention the method of uniting a lead pillar to the thermoplastic lid of a similar thermoplastic container consists in molding the thermoplastic material of the lid or of a bush to be secured in the lid on to the top of the pillar, the lower end of the pillar being subsequently connected to its plates by burning. In this way no heat is applied to the pillar adjacent to the thermoplastic composition. Where inter-cell connectors are employed, these are electrically connected to the top of the pillar in the lid or in the bush in the lid, by a mercury seal or by a mechanical joint, but without the use of heat in making the joint.

In either case the molded socket in which the upper end of the pillar is housed has a cup-like extension projecting above the plane of the lid or cover and the wall of this cup is apertured to receive the end of a copper or like conductor forming the inter-cell connector having an insulating covering of the same thermo-plastic material as that from which the socket is made, or a similar material which can be cemented to the socket material where the sleeving of the conductor passes through the wall of the cup. The end of the conductor which lies within the cup is bared and electrical contact between the end of the pillar and the conductor may be secured by means of a mercury seal, by a binding screw or in any other suitable manner. The open end of the cup is closed by a disc or cap of molded material which is cemented in place after the necessary contact has been made.

Such an arrangement secures a sound mechanical and acid tight connection between the component parts of the lid and the pillar and efficient electrical contact between the terminals of the individual cells. In the case of the end cell the pillar cup includes a socket for a take-off lead and the inner end of the electrical socket is maintained in contact with the pillar in the same way as the inter-cell connector.

The invention will be more particularly described by the aid of the accompanying drawings of which—

Figure 1 is a sectional end elevation of two interconnected cells constructed in accordance with the invention wherein the left hand side shows the lead pillar with a thermoplastic bush molded thereon prior to connection to the lid while the right hand side shows the lid molded directly upon the upper end of the lead pillar.

Figures 2 and 3 are sectional elevations of cells with the cell lids molded directly on to the lead pillars and show methods of forming connections for take off leads from said pillars or for terminals on said pillars.

The upper end of each of the lead plate-supporting pillars $a$ has an enlarged head which is provided with circumferential bonding grooves $b$ or the like depressions. The grooved head has molded around it the lid or cover $c$ of a cell $d$ of a thermoplastic material such as polystyrene resin (see right side of Figure 1). The head of the pillar forms the base of an open-ended boss or cup $c^1$ and the wall of this cup is provided with a lateral opening to receive the end of a copper wire $e$ which is also coated with polystyrene resin or other cementable resin as indicated at $e^1$. The end of the inter-cell connector which lies within the cup is bared and electrical contact between the end of the pillar and the conductor is secured by means of a mercury seal $f$, the open end of the cup being closed by a disc or cap $g$ which is cemented in place.

The term "pillar" as used herein includes the usual terminal post and plate connecting strap, which are integrally cast prior to assembly with the plate groups.

As shown on the left hand side of Figure 1, the thermoplastic cell lid is molded with a socket $h$ to receive a thermoplastic bush $h^1$ preferably of polystyrene or the like molded on to the enlarged end of the pillar $a$ and cemented into the socket, the open ended boss or cup $c^2$ to receive the opposite end of the inter-cell connector and the mercury seal in this case being formed in the bush $h^1$, the head of the pillar $a$ in both cases being provided with a copper or like ferrule $j$, and the coating of the wire $e$ at both ends being cemented to the cups $c^1$ and $c^2$.

The cell cap $c$ is molded directly on to the lead pillar $a$ in the end cell illustrated in Figure 2 but the bared end of the take off lead $k$ is connected to the head of the pillar $a$ by means of the binding screw $m$ after which a cap $g$ of polystyrene resin is cemented in place to close the cup $c^1$ after contact has been made.

Instead of the binding screw $m$ the head of the pillar may contain an aperture to receive the bared end of the copper wire $k$ and is subsequently deformed to ensure good electrical contact.

According to the construction illustrated in Figure 3 which shows the arrangement for a 2-volt cell where intercell connectors are not required and the take-off is provided by a spring contact, a brass cap $n$ is molded on the pillar $a$ before the lid $c$ is molded thereon as previously described.

After the molding operation, the lower end of the pillar $a$ is secured to its plates $o$ by burning, and the lid $c$ is cemented in place.

All the connections between pillars and plates and between cells are made without the application of heat in the vicinity of the thermoplastic components and the method enables relatively thin and therefore light cells to be used besides bringing about a considerable reduction in the weight of the pillars, the inter-cell connectors, and of the take-off connectors which incorporate suitable sockets for the leads.

It will be understood that although polystyrene resin has been named by way of example, any other suitable thermoplastic resin possessing the necessary electrical and mechanical properties may be employed without departing from the invention.

What I claim is:

1. For assembly in an electric storage battery, a prefabricated post and closure unit including an integrally cast metallic post and strap, said strap adapted to be welded to a group of plates of like polarity, said post having a series of bonding grooves remote from the strap, a thermoplastic member molded about said post in the region of said bonding grooves and adapted at least partially to close the top of a battery cell, said thermoplastic member having a boss surrounding said post and an aperture through said boss for passage of a conductor, and means for connecting said conductor to said post within said boss.

2. In a storage battery, a prefabricated post and closure device including an integrally cast metallic post and strap, said strap being welded to a group of plates of like polarity, said post having a series of bonding grooves remote from the strap, a thermoplastic member molded about said post in the region of said bonding grooves and at least partially closing the top of the battery, said thermoplastic member having a boss surrounding said post beyond said bonding grooves and an aperture through said boss, a conductor passing through said aperture and connected to said post, and means closing the upper end of the space within said boss.

EDWARD SPENCE CHAPMAN.

REFERENCES CITED

The following references are of record in the file of this patent:

UNITED STATES PATENTS

| Number | Name | Date |
|---|---|---|
| 1,316,490 | Loudon | Sept. 16, 1919 |
| 1,380,061 | Hazelett | May 31, 1921 |
| 1,402,673 | Skinner et al. | Jan. 3, 1922 |
| 1,990,445 | Younkman | Feb. 5, 1935 |
| 2,071,469 | Lormor | Feb. 23, 1937 |